United States Patent
Czajkowski

(10) Patent No.: US 7,260,742 B2
(45) Date of Patent: Aug. 21, 2007

(54) SEU AND SEFI FAULT TOLERANT COMPUTER

(76) Inventor: David R. Czajkowski, 332 Alviso Way, Encinitas, CA (US) 92024

( * ) Notice: Subject to any disclaimer, the term of this patent is extended or adjusted under 35 U.S.C. 154(b) by 472 days.

(21) Appl. No.: 10/767,477

(22) Filed: Jan. 28, 2004

(65) Prior Publication Data

US 2005/0005203 A1    Jan. 6, 2005

Related U.S. Application Data

(60) Provisional application No. 60/442,727, filed on Jan. 28, 2003.

(51) Int. Cl.
*G06F 11/00* (2006.01)
(52) U.S. Cl. ............ 714/21; 714/17; 714/822
(58) Field of Classification Search ......... 714/16, 714/17, 21
See application file for complete search history.

(56) References Cited

U.S. PATENT DOCUMENTS

| | | | | |
|---|---|---|---|---|
| 4,132,975 A | * | 1/1979 | Koike | 714/797 |
| 4,199,812 A | * | 4/1980 | Klotzner et al. | 701/104 |
| 4,670,880 A | * | 6/1987 | Jitsukawa et al. | 714/797 |
| 4,817,094 A | * | 3/1989 | Lebizay et al. | 714/797 |
| 4,943,969 A | * | 7/1990 | Criswell | 714/820 |
| 4,959,836 A | * | 9/1990 | Berard et al. | 714/822 |
| 5,235,220 A | * | 8/1993 | Takizawa | 326/35 |
| 5,706,423 A | * | 1/1998 | Sugimoto | 714/49 |
| 5,822,515 A | * | 10/1998 | Baylocq | 714/56 |
| 5,903,717 A | * | 5/1999 | Wardrop | 714/12 |
| 6,298,289 B1 | * | 10/2001 | Lloyd et al. | 701/13 |
| 6,625,756 B1 | * | 9/2003 | Grochowski et al. | 714/17 |
| 6,910,178 B1 | * | 6/2005 | Kiselev et al. | 714/819 |
| 7,107,515 B2 | * | 9/2006 | Majumdar | 714/797 |
| 2004/0153747 A1 | * | 8/2004 | Czajkowski | 714/10 |
| 2005/0055607 A1 | * | 3/2005 | Czajkowski et al. | 714/25 |

FOREIGN PATENT DOCUMENTS

GB    2 903 614    * 9/1982

OTHER PUBLICATIONS

Mukherjee eta l.; "Detailed Design and Evaluation of Redundant Multithreading Alternatives"; International Conference on Computer Architecture, Proceedings of the 29th Annual International Symposium on Computer Architecture; published 2002; pp. 99-110.*
Reinhardt et al.; "Transient Fault Detection Via Simultaneious Multithreading"; International Conference on Computer Architecture, Proceedings of the 27th Annual International Symposium on Computer Architecture; published 2000; pp. 25-36.*
Oh et al.; "Error Detection by Duplicated Instructions in Super-Scalar Processors"; IEEE Transactions on Reliability, vol. 51, No. 1, Mar. 2002; pp. 63-75.*

* cited by examiner

*Primary Examiner*—Scott Baderman
*Assistant Examiner*—Joshua Lohn
(74) *Attorney, Agent, or Firm*—The Nath Law Group; Robert P. Cogan

(57) ABSTRACT

A non-hardened processor is made fault tolerant to SEUs and SEFIs. A processor is provided utilizing time redundancy to detect and respond to SEUs. Comparison circuitry is provided in a radiation hardened module to provide special redundancy with the need to run additional processors. Additionally, a hardened SEFI circuit is provided to periodically send a signal to the process which, in the case of a processor not in the SEFI state, initiates production by the processor of a "correct" response. If the correct response is not received within a particular time window, the SEFI circuit initiates progressively severe actions until a reset is achieved.

16 Claims, 3 Drawing Sheets

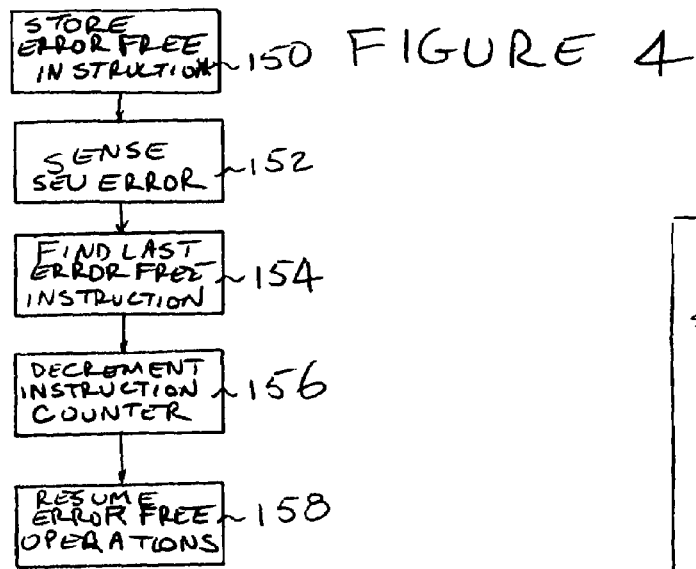
FIGURE 4
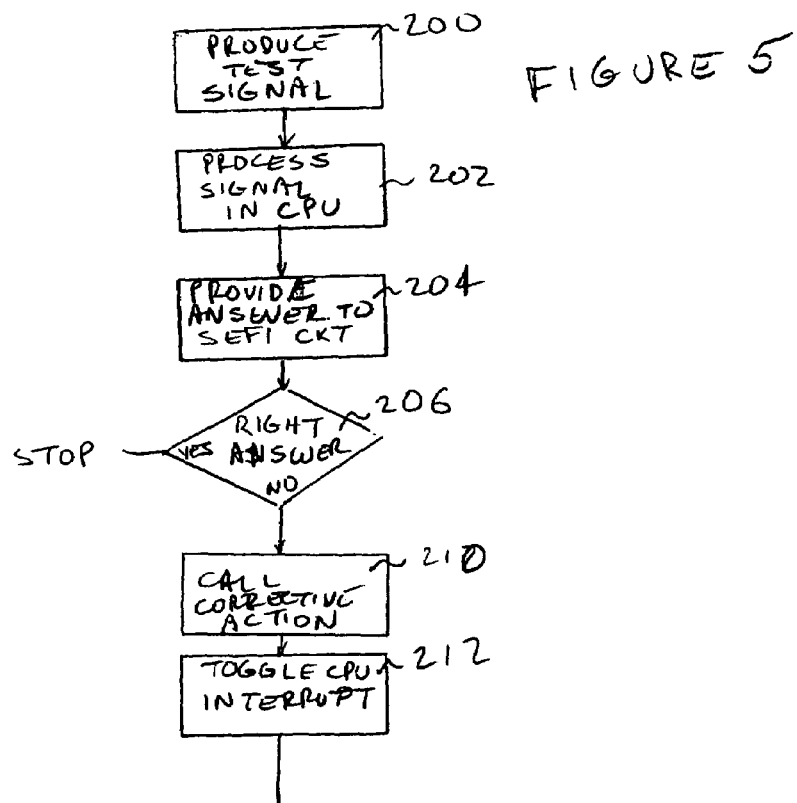
FIGURE 5
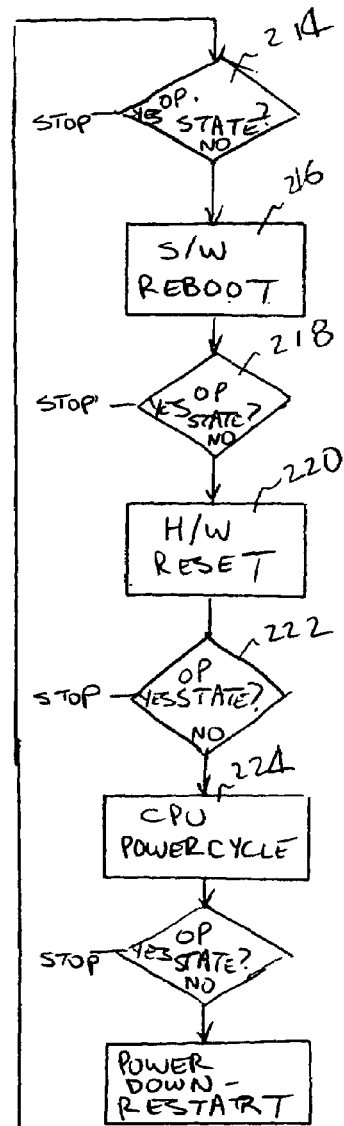

SEU AND SEFI FAULT TOLERANT COMPUTER

CROSS REFERENCE TO RELATED APPLICATIONS

This patent application claims priority of provision patent application 60/442,727, filed Jan. 28, 2003.

BACKGROUND OF THE INVENTION

The present invention relates to fault tolerant computers and more specifically to a method and apparatus for operating in an error free manner when a microprocessor error is induced.

Three basic factors contributing to the functioning of a computer, and more specifically to a microprocessor or microprocessors included in a computer are power, performance and environment-induced radiation effects. New models or generations of computers seek to achieve higher performance at lower power levels. Additionally, in applications in which microprocessors are exposed to ionizing radiation, it is necessary to provide a mechanism for maintaining reliable operation when it is a virtual certainty that the ionizing radiation will cause processor errors. An example of applications in which sufficient levels of radiation will be encountered to cause errors in spaceborne computers. In applications in which particle or ionizing radiation is not present, errors can be caused by other fault mechanisms such as electrically induced noise pulses.

The most significant error events are Single Event Upset (SEU) and Single Event Functional Interrupt (SEFI). SEU is defined by NASA as "radiation-induced errors in microelectronic circuits caused when charged particles (usually from the radiation belts or from cosmic rays) lose energy by ionizing the medium through which they pass, leaving behind a wake of electron-hole pairs. In other words SEU is a change of state or transient induced by an energetic particle such as a cosmic ray or proton in a device. SEUs are "soft errors" in that a reset or rewriting of the device causes normal device behavior thereafter. However, the error must be accounted for when it is included in data to be acted upon. An SEFI is a condition in which an SEU in the device's control circuitry places the device into a test mode, halt, or undefined state. The SEFI halts normal operations, and is believed to require a power reset to recover. SEU error rates in a nominal application for commercial microprocessors can range from 0.2 to 9 MeV/mg/cm$^2$. This range of rates is reflected in processor performance, depending on the processor and its environment, from a quite acceptable single upset per year to an unacceptable multiple upsets per hour.

Improved SEU performance when designing microprocessor systems commonly results in increased power consumption. However, this technique does not solve the problem of SEUs and SEFIs due to radiation or electrically induced noise pulses. One prior art approach comprises utilizing radiation hardened microprocessors which will not be susceptible to the errors induced by radiation. However, radiation hardened microprocessors are not available in state of the art versions. They have over the past ten years lagged non-hardened processors by two to three generations. For example, currently available radiation hardened microprocessors include a 0.35 micron SOI (Silicon on Insulator) microprocessor and a 0.25 micron bulk CMOS on EPI processor (Complimentary Metal Oxide Semiconductor on Epitaxial Layer). However, state of the art microprocessors utilize 0.13 and 0.10 geometries. Radiation hardened microprocessors also lag the state of the art in terms of MIPS (Million Instructions Per Second) capability.

Another known technique is TMR, triple modular redundancy, applied at the system level, also known as spatial redundancy. Three individual or discrete processors run instructions in parallel and synchronously. The outputs of the processors are sent to a comparator that utilizes voting logic. When an SEU occurs in one processor, the other two processors will still produce matching outputs. The comparator will pass the majority output. SEFI errors are treated as SEUs. However, the processor experiencing the SEFI will remain offline until reset or otherwise corrected. TMR triples the processor power requirements compared to a single processor. Synchronizing the processors is difficult, and operation must be slowed with respect to the speed achievable by a single processor.

Time redundancy has been employed at the system level to provide the advantage of redundancy as described above while permitting the use of a single processor. In this technique, the processor executes the same instruction three times, or two times, comparing results, and runs a third time when the results do not agree. The result, or a checksum indicative of the result, is stored and the three stored outputs are compared. Three matching results indicate the absence of an SEU. If there is an SEU, a voting circuit selects the correct result. When the SEU corrupts data, the time redundancy technique will operate correctly. However, if the SEU causes an instruction to be corrupted, the technique will not operate correctly. A bit instructing a wrong operation will cause the wrong operation to be performed all three times. SEUs are not detected and SEFIs are not corrected. An improved form of time redundancy was developed by the Stanford Advanced Research and Global Observations Satellite Project (ARGOS). This technique is described in Oh, N., P. P. Shirvani and E. J. McCluskey, "*Error Detection by Duplicated Instructions In Super-scalar Processors,*" *IEEE Transactions on Reliability*, Vo. 49, No. 7, September 2001, pp. 273-284. Many errors were corrected, but still others were not.

Another prior art alternative is to build a processor using commercial, non-radiation hardened integrated circuit process and apply known RHBD (radiation hardness by design) techniques to improve radiation hardness. Once again, as in the case of radiation hardened processors, die area is increased and operating speed are compromised. Also, while commercial switching logic utilizes simple flip-flops, RHBD logic requires latches built out of many flip-flops and further logic such as inverters. Performance comparable to commercial processors which are not radiation hardened is not provided.

Examples of an improved radiation hardened system and a time redundant system are respectively disclosed in my copending patent application Ser. No. 10/435,626 filed May 6, 2003 entitled Fault Tolerant Computer and Ser. No. 10/656,720 (with a coinventor) filed Sep. 8, 2003 entitled Functional Interrupt Mitigation for Fault Tolerant Computer, the disclosures of which are incorporated by reference herein. It is desirable to provide a system in which a minimal amount of radiation hardening need be done. It is desirable to provide a system in which a time redundant system is also made space redundant, but in an efficient, reliable manner. For example, it is desired to avoid the problem of synchronizing a plurality of processors.

There is little patent literature on SEFIs. Many testing efforts with microprocessors do not report SEFIs, or "hangs." It is probable that all microprocessors will exhibit SEFIs whether they have been previously observed or not. This will include both commercial and radiation hardened devices. SEUs may take place in any transistor within a complex microprocessor. When the upset occurs in a memory location, whether a register or memory site, this can be measured and corrected. However, when the upset occurs in more subtle ways, the processor may be placed in a state from which it is not recoverable. An example is the case of an induced error in combinatorial logic or in state-machine transistors. It may be initially impossible to observe an error condition within the processor. However, the error may propagate within combinatorial logic. Other unrecoverable faults could include illegal branching, upset induced exceptions, upsets in the program counter or other unobservable faults. Work by such researchers as Dr. James W. Howard of Jackson and Tull Chartered Engineers of Washington, D.C. has demonstrated that SEFIs will occur in Pentium®, PowerPC and other processors. It is highly probable that all microprocessors will exhibit SEFIs whether they have been previously observed or not. It is therefor highly desirable to provide a way of detecting SEFIs so they may be responded to and also providing a way of responding to them.

SUMMARY OF THE INVENTION

Briefly stated, in accordance with the present invention, a method and apparatus are provided utilizing time redundancy combined with spatial redundancy in which benefits of modular redundancy are provided by in which the addition of components is minimized and in which benefits of time redundancy are provided with a minimum increase in operational complexity and in which errors not resolved by prior art time redundancy techniques are detected. SEUs are responded to. Additionally, the occurrence of SEFIs is accounted for.

A non-hardened processor is made fault tolerant to SEUs and SEFIs. A processor is provided utilizing time redundancy combined with spatial redundancy, which is also referred by applicant's trademarks time-triple modular redundancy and TTMR, using a single processor to detect and respond to SEUs. External comparison circuitry is provided in a radiation hardened module to provide "TTMR" redundancy to protect for SEU errors on input output buses. Additionally, a hardened SEFI circuit is provided to periodically send a signal to the process which, in the case of a processor not in the SEFI state, initiates production by the processor of a "correct" response. If the correct response is not received within a particular time window, the SEFI circuit initiates progressively severe actions until a reset is achieved.

Other aspects of the invention are further described below. This summary is neither exhaustive nor determinative of the scope of the present invention.

BRIEF DESCRIPTION OF THE DRAWINGS

The invention may be further understood by reference to the following description taken in connection with the following drawings.

Of the drawings:

FIG. 4 is a flow diagram illustrating an alternative operation of the SEU recovery circuit and the programmed media commanding the operation; and FIG. 5 is a flow diagram illustrating the operation of the SEFI monitoring circuit of FIG. 1.

DETAILED DESCRIPTION

Figure 1:
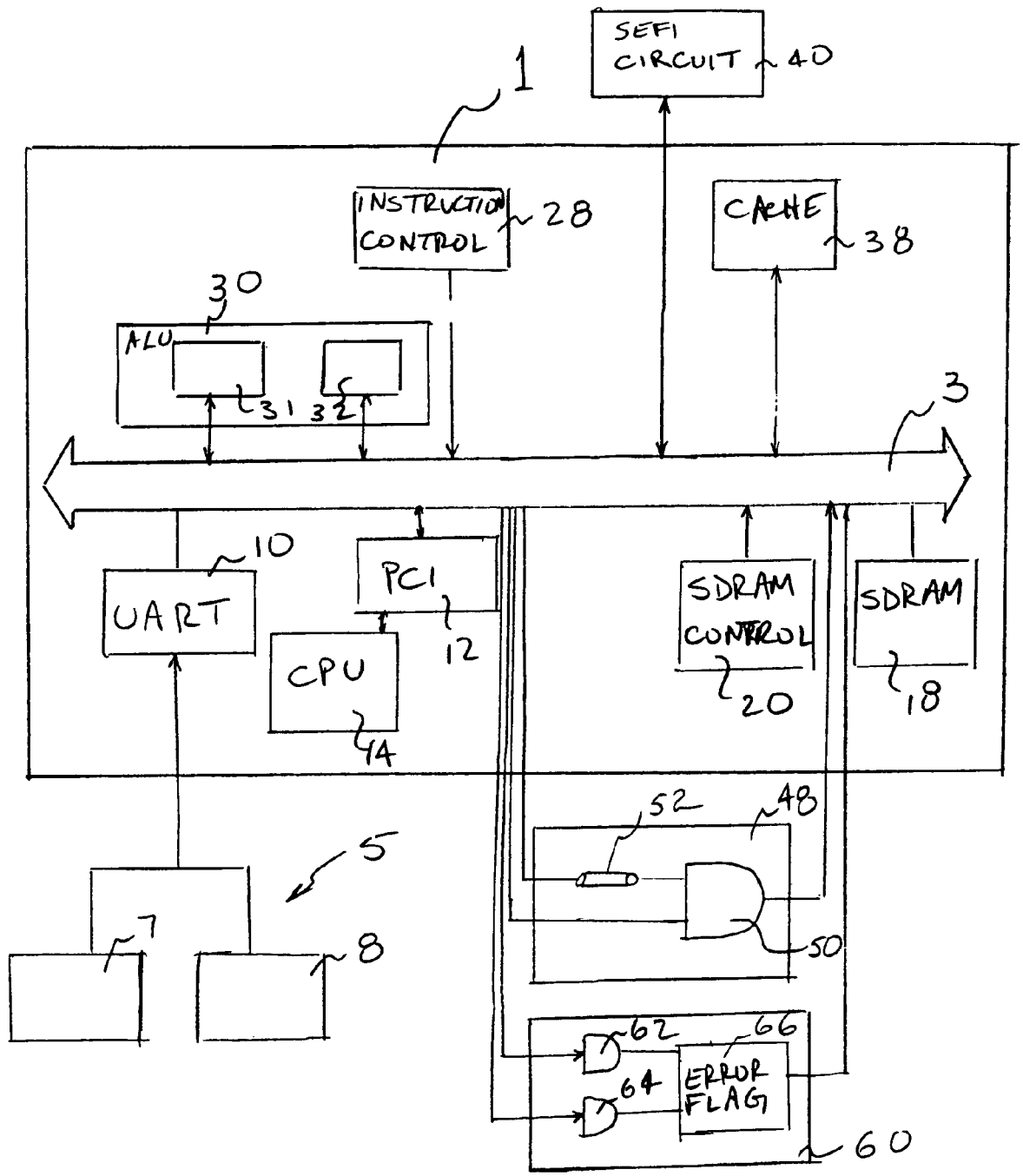
FIG. 1 is a block diagram of a computer constructed in accordance with the present invention including an SEU detection circuit and SEU recovery circuit.

FIG. 1 is a block diagrammatic illustration of a processor 1 communicating via a bus 3 to peripheral devices 5. The processor 1 could, for example, be included in a satellite. The peripheral devices 5 may include a communication device 7 and sensors 8. Any number of well-known input and output devices may interact with the processor 1. The term processor is used here to denote a device which functions as a computer, e.g. a Pentium microprocessor chip, and does not describe only a subcomponent such as a discrete arithmetic unit. The processor 1 will in contemplated embodiments comprise a silicon chip, but may comprise any processor subject to the Single Event Upset (SEU) and Single Event Functional Interrupt (SEFI) phenomena, whether due to radiation or noise. It should be noted that a computer to be used in accordance with the present invention need not have the particular architecture as illustrated here. There are many well-known architectures providing the operation described here. Also, since microprocessor chips have many, many subsystems, it is common that representations of identical chips may take many different forms. Commercially available chips have detailed date sheets describing units available in the chips to perform various functions. In one preferred embodiment, the processor 1 is an Equator BSP-15 processor from Equator Technologies, Inc. of Campbell, Calif.

The bus 3 may be interfaced to the peripheral devices 5 by a universal asynchronous receiver/transmitter (UART) 10. The processor 1 also uses a peripheral component interconnect (PCI) 12 to decouple a central processing unit 14, also coupled to the bus 3, from the relatively slow peripheral devices 5. Components of the processor 1 are coupled to communicate via the bus 3. The processor 1 comprises a main memory 18 which is a synchronous dynamic random access memory (SDRAM) 18 coupled to the bus 3. In other embodiments, other forms of dynamic storage could be utilized. The SDRAM 18 is controlled by an SDRAM controller 20. An instruction control unit 28 coupled to the bus 3 coordinates execution of program instructions, In the present embodiment, arithmetic operations are performed by an arithmetic logic unit 30. In the BSP 15 processor, the arithmetic logic unit 30 comprises first and second units 31 and 32. A clock control 36 and memory cache 38 are also coupled to the bus 3. An SEFI control circuit 40, discussed further below, is coupled to the bus 3. SEFI circuit 40 is external to processor 1.

In the "time-triple modular redundancy" (TTMR) technique, a calculation is performed at times $t_0$, $t_1$, and $t_2$, each time corresponding to a successive cycle of the bus 3. The results are polled for "two out of three" matching to assure a correct result. The present invention examines both memory and bus data transfers by adding an external hardware compare operation in the path of data being processed. The additional hardware should be radiation hardened. By simplifying the technique, the additional hardware, and thus the expense in its implementation is minimized. In the present invention, the computation is performed twice. The first computation is the original computation, and the second computation is referred to as a mirror calculation. If a match is obtained when the successive results produced at times $t_0$ and $t_1$ are compared, then two matching results are known to exist. It is, therefore, unnecessary to perform the third computation using the value produced at time $t_2$. Since, in a nominal application, SEUs occur only about 1% of the time, it is not necessary to perform the third calculation 99% of the time.

In an SEU detection circuit 48, a comparison of first and second signals is made by a comparator 50. As used herein, discrete logic primarily refers to a "hardware" rather than "software" implementation. While logic elements in FIG. 1 are illustrated as discrete logic elements, they do not need to be discrete components. The logic circuitry of FIG. 1 could be embodied in a larger chip either as separately identifiable components or embodied within an integrated circuit, e.g. a field programmable gate array (FPGA). A first input is provided to the comparator 50 from a delay line 52. A second input to the comparator 50 is coupled from the SDRAM 18. The comparator provides an output to the bus 3 having a first state indicative of a match between the two inputs or a second state indicate of a non-match. The second state is referred to as an SEU error flag.

The SEU error flag initiates operation of the SEU recovery circuit 60. A first comparator 62 compares the outputs calculated at times $t_1$ and $t_2$. A second comparator compares 64 the results produced at times $t_0$ and $t_2$. Error flag logic circuit 66 receives the outputs of the comparators 62 and 64 to provide an output of the first state if either of the comparators 62 and 54 indicate a match. If there is not a match at either comparator 62 or 64, the error flag logic circuit produces an error signal to prohibit use of an incorrect calculation.

Figure 2:
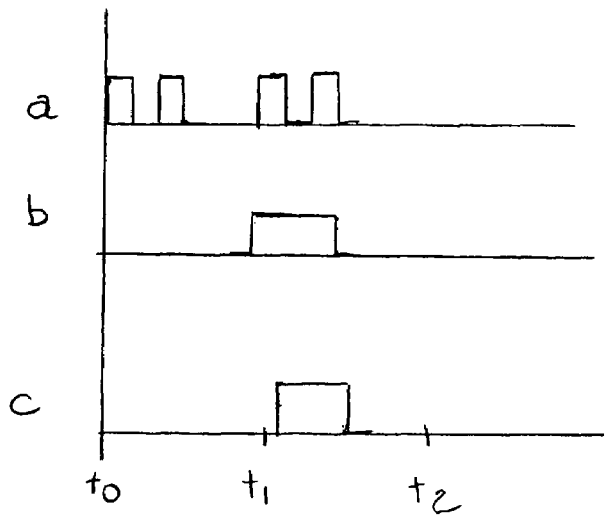
FIG. 2 is a timing diagram useful in understanding the operation of the embodiment of FIG. 1.

Operation is described with respect to FIG. 2, which is a timing diagram. In FIG. 2, the abscissa is time, divided into cycles of the bus 3, and the ordinate is amplitude on an arbitrary scale indicative of logical zeros or ones. FIG. 2a illustrates the signal to the first input of the comparator 50, FIG. 2b illustrates the second input to the comparator 50 and FIG. 2c illustrates the output of the comparator 50. At time $t_0$, an input indicative of a first result is supplied to the delay line 52 from the SDRAM 18 under the control of the SDRAM control 20. At time $t_1$, an input indicative of a second result is supplied to the second input of the comparator 50 and also to the input of the delay line 52. By time $t_1$, the first result has propagated to the first input of the comparator 50. Consequently, the comparator 50 compares the first and second results produced by the processor 1. If the inputs to the comparator agree, an output of the first state is provided by the comparator 50. This output is interpreted by the SDRAM control 20 so that the value produced by the calculation under consideration. The value is released for further processing in accordance with the programmed instructions. The input, delay and comparison process is not repeated. If the inputs do not agree, as illustrated in the example of FIG. 2, then the comparator 50 produces the SEU error flag. The SEU error flag is used to call operation of the SEU recovery circuit 60.

Figure 3:
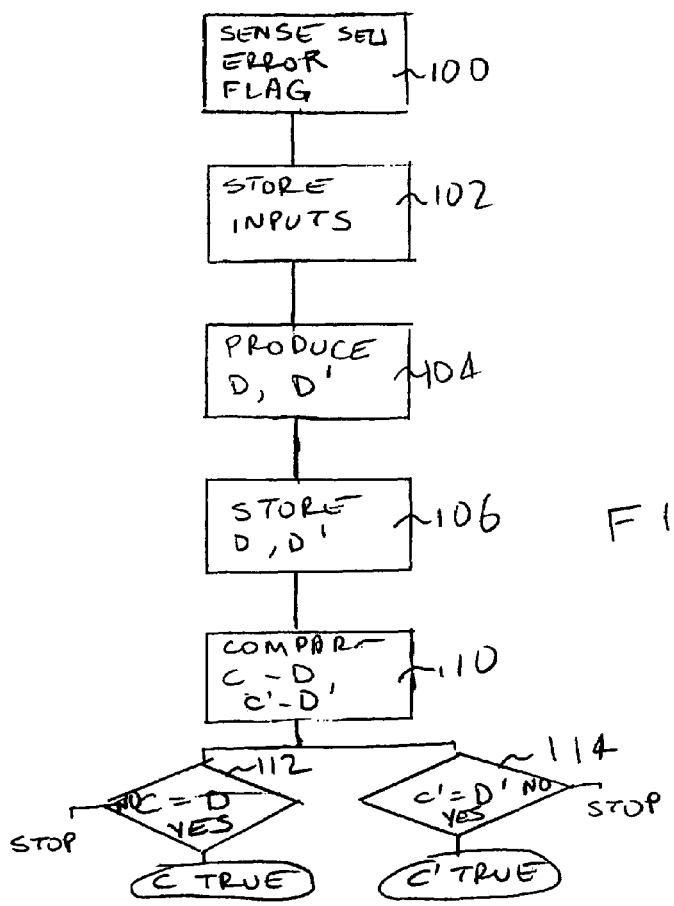
FIG. 3 is a flow diagram illustrating the operation of the SEU recovery circuit and the programmed media commanding the operation.

Operation of the SEU recovery circuit is illustrated in FIG. 3, which is a flow diagram. In the situation in which an SEU occurs, at block 100, the SEU error flag is produced by the comparator 50 and supplied to the processor 3 to call the operation of FIG. 3. The SEU may be detected in the absence of a value to be compared as well as in the case of a mismatch. Absence of a signal in the present example is the failure of an input to the comparator to occur prior to a timeout, which will not exceed on bus 3 cycle. At block 102, the inputs data to the comparator 50 are each written to a storage location. The original and mirror outputs produced at $t_0$ and $t_1$ are respectively referred to as C and C'. The processor 1 is commanded at block 104 to produce two further successive outputs at successive cycles of the bus 3. The results of the initial calculation and the mirror calculation are stored as D and D' at block 106. In the nominal environment for the present invention, if there has been an SEU in the cycle in which C and C' were produced, the probabilities are such that there should not be an SEU in the calculation of D and D'. C is compared to D at block 110. C' is compared to D' at block 112. At block 110, if C matches D, the value of C is treated as "true," and the value of C is sent to bus 3 to be utilized as a valid result. At block 112, if C' matches D', the value of C' is treated as "true," and the value of C is sent to bus 3 to be utilized as a valid result.

Alternatively, the method of FIG. 4 may be used to respond to an SEU error flag. At block 150, a command is issued to store instructions a each instruction is determined to be error free. At block 152, the SEU error flag is generated. At block 154, the stored commands are examined to determine the last instruction having an error free status. At block 156, the instruction control unit 28 is "decremented" to return to the last error free operation, and at block 158, the instruction stream is resumed and discarded operations are repeated.

It is also desirable to detect SEFIs. These are faults from which the processor 1 does not recover. The SEFI circuit 40 (FIG. 1) is a radiation hardened circuit to monitor status of the processor 3 and reset it. As indicated in FIG. 5, at block 200, the SEFI circuit 40 provides a test signal to the processor 1. The period of the test signal production may be relatively long. The test signal 1 requires processing by the CPU 14, as indicated at block 202. If the processor 1 is not in the SEFI mode, it will respond by producing a "correct" answer as indicated at block 204. The SEFI circuit 40 must receive the correct answer before a preselected time-out, such as one or a preselected number of cycles of the bus 3. As indicated at block 206, if the correct answer is received, operation returns to block 200 to be resumed at the beginning of a next test signal period. If not, operation proceeds to block 210, where a corrective action routine is called. A first corrective action is initiated at block 212. This action is toggling of the interrupt of the CPU 14.

At block 214, operation is tested. If the processor 1 is returned to a known, operative state, the operation ceases until the next test signal. If not, operation proceeds to block 216, which is a software reboot with a flag set to signify an SEFI event. At block 218, operation is tested. If the processor 1 is returned to a known, operative state, the operation ceases until the next test signal. Also, the SEFI circuit 40 may produce a "return from SEFI" flag. In not, operation proceeds to block 220. The corrective action at block 220 is a hardware reset utilizing the "reset" input of the CPU 14. At block 222, operation is tested. If the processor 1 is returned to a known, operative state, the operation ceases until the next test signal. If not, operation proceeds to block 224 at which the CPU 14 is run through a power cycle. At block 226, operation is tested. If the processor 1 is returned to a known, operative state, the operation ceases until the next test signal. If not, operation proceeds to block 228. At block 228, the processor 1 is powered down and then restarted.

Each correction will attempt to return the CPU from SEFI by operating special software routines to self-test of roll back operation to return the hardware to a known state. The SEFI circuit 40 can be implemented by triple modular redundant FPGAs or it can be radiation hardened application specific integrated circuit (ASIC). Since the digital logic needed for the SEFI circuit 40 is estimated to be 6,000 gates, it can be implemented on a relatively small silicon chip at reasonable cost. Recovery capabilities are embedded in software routines, such as the ability to store selected data variables in memory for later recovery. Additional recovery capabilities are embedded in software routines such as the ability to store selected data variables in memory for later recovery in response to the "return from SEFI" flag.

Software embodying the above operation may be made available to users with standard software tools and languages. The most common engineering language is C/C++. This language is supported by the Equator BSP-15 of the preferred embodiment and many widely used processors. A precompiler will duplicate computation code to produce mirror code to perform time redundant operations. The code produced for the present invention can be implemented in a real time operating system (RTOS). A preferred real time operating system is $OSE_{CK}$ from Enea Embedded Technology of San Diego, Calif.

The techniques of the present invention can be applied to the design of a new very long instruction work (VLIW) processor to achieve a greatly improved SEU and SEFI error rate using either hardware or software implementations. Advantageously, a microprocessor integrated circuit (IC or chip) may be designed from commercially available VLIW cores. Combined time and special redundancy and RHBD logic to a microprocessor with attention to SEU tolerance and performance will allow for significant advances in SEU hardened computing. The combined time and special redundancy can be adapted for both memory and bus data transfers by adding a hardware compare in SEU hardened logic in the data path along with the proper sequencing of data transfer and design of an SEU interrupt routine. The above teachings will enable those skilled in the art to take many departures from the specific examples above to produce systems in accordance with the present invention.

What is claimed is:

1. A fault tolerant computer comprising: a non-radiation hardened processor to execute instructions, said processor including instructions to execute an original and mirror instructions to produce results to be compared in a redundancy routine, said compared results being produced during separate time periods, a radiation hardened comparison circuit coupled to compare an original result and a first mirror result, said comparison circuit providing an output of a first state when said original result agrees with said mirror result and an output of a second state when said original result and said mirror result disagree, said second state comprising an SEU error signal.

2. A fault tolerant computer according to claim 1 wherein absence of an original or mirror result comprises disagreement with the other result.

3. A fault tolerant computer according to claim 1 wherein said comparison circuit output is coupled to inhibit production of additional mirror results when said output is in the first state.

4. A fault tolerant computer according to claim 3 wherein said processor is provided with instructions to perform an SEU recovery routine in response to detection of an SEU error signal.

5. A fault tolerant computer according to claim 4 wherein said processor comprises means for storing the original result and the mirror result in response to an SEU error signal, means coupling the SEU error signal to command production of a next original result and a next mirror result, coupling means coupling said original result for comparison with said next original result by said comparison circuit and coupling said mirror result for comparison with said next mirror result by said comparison circuit and said comparison circuit comprising means for producing a signal of the first state when at least one of the original result and next original result or the mirror result and next mirror result match to allow use of a result matching a next result by said processor.

6. A fault tolerant computer according to claim 5 wherein allowing use comprises transmitting the result to a processor bus.

7. A fault tolerant computer method comprising: executing an original and mirror instructions in a non-radiation hardened processor to produce an original and a mirror result respectively to be compared in a redundancy routine, said compared results being produced during separate time periods, comparing said original and mirror results in a radiation hardened comparison circuit, and providing an output of a first state when said original result agrees with said mirror result and an output of a second state when said original result and said mirror result disagree, said second state comprising an SEU error signal.

8. A method according to claim 7 comprising producing an output of the second state from said comparison circuit in the absence of the original or the 3 mirror result.

9. A method according to claim 7 further comprising inhibiting production of additional mirror results when said output is in the first state.

10. A method according to claim 9 further comprising performing an SEU recovery routine in response to detection of an SEU error signal.

11. A method according to claim 10 further comprising storing the original result and the mirror result in response to an SEU error signal, coupling the SEU error signal to command production of a next original result and a next mirror result, coupling said original result for comparison with said next original result by said comparison circuit and coupling said mirror result for comparison with said next mirror result by said comparison circuit and producing in said comparison circuit a signal of the first state when at least one of the original result and next original result or the mirror result and next mirror result match to allow use of a result matching a next result by said-processor.

12. A method according to claim 11 wherein allowing use comprises transmitting the result to a processor bus.

13. A programmed medium which when executed on a processor performs the steps of: executing an original and mirror instructions in a processor to produce an original and a mirror result respectively to be compared in a redundancy routine, providing the original and the mirror result respectively to be compared in a redundancy routine to a comparator external to the processor, said compared results being produced during separate time periods, and directing comparison results to the processor from the comparator, receiving signals indicative of a comparison by a radiation hardened comparison circuit, and responding to an output of a first state from said comparison circuit when said original result agrees with said mirror result to treat the original result as true and responding to an output of a second state from said comparison circuit when said original result and said mirror result disagree, said second state comprising an SEU error signal, to treat the original result as not true.

14. A medium according to claim 13 further performing the step of inhibiting production of additional mirror results when said output is in the first state.

15. A medium according to claim 14 further performing the step performing an SEU recovery routine in response to detection of an SEU error signal.

16. A medium according to claim 15 further performing the steps of storing the original result and the mirror result in response to an SEU error signal, coupling the SEU error signal to command production of a next original result and a next mirror result, coupling said original result for comparison with said next original result by said comparison circuit and coupling said mirror result for comparison with said next mirror result by said comparison circuit and responding to producing in said comparison circuit a signal of the first state when at least one of the original result and next original result or the mirror result and next mirror result match to allow use of a result matching a next result by said processor.

\* \* \* \* \*